(12) United States Patent
Ying

(10) Patent No.: US 6,353,443 B1
(45) Date of Patent: *Mar. 5, 2002

(54) MINIATURE PRINTED SPIRAL ANTENNA FOR MOBILE TERMINALS

(75) Inventor: Zhinong Ying, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 09/112,366

(22) Filed: Jul. 9, 1998

(51) Int. Cl.$^7$ .............................................. H01Q 1/24
(52) U.S. Cl. ........................ 345/702; 343/700 MS; 343/850; 343/895
(58) Field of Search .................... 343/700 MS, 702, 343/850, 851, 852, 895

(56) References Cited

U.S. PATENT DOCUMENTS

| | | |
|---|---|---|
| 676,332 A | 6/1901 | Marconi |
| 1,837,678 A | 12/1931 | Ryder |
| 2,966,679 A | 12/1960 | Harris ........................ 343/895 |
| 2,993,204 A | 7/1961 | Macalpine .................. 343/745 |
| 3,573,840 A | 4/1971 | Gouillou ..................... 343/745 |
| 4,012,744 A | 3/1977 | Greiser ........................ 343/895 |
| 4,121,218 A | 10/1978 | Irwin ........................... 343/702 |
| 4,137,534 A | 1/1979 | Goodnight .................. 343/752 |
| 4,161,737 A | 7/1979 | Albright ...................... 343/749 |
| 4,169,267 A | 9/1979 | Wong et al. ................. 343/895 |

(List continued on next page.)

FOREIGN PATENT DOCUMENTS

| | | |
|---|---|---|
| AU | 55898 73 | 11/1974 |
| DE | 31 29 045 | 10/1982 |
| EP | 0 372 720 | 6/1990 |
| EP | 0 511 577 | 11/1992 |
| EP | 0 522 806 | 1/1993 |
| EP | 0 590 671 | 4/1994 |
| EP | 0 593 185 | 4/1994 |
| EP | 0 635 898 | 1/1995 |
| EP | 0 644 606 | 3/1995 |
| EP | 0 660 440 | 6/1995 |
| EP | 0 747 989 | 12/1996 |
| EP | 0 777 293 | 6/1997 |

(List continued on next page.)

OTHER PUBLICATIONS

"A Wideband Dual Meander Sleeve Antenna" by M. Ali et al., 1995 IEEE, pp. 1124–1127.
Patent Abstracts of Japan, JP–0236602, Sep. 30, 1994.
"Antennas", by J.D. Kraus, (McGraw–Hill Book Co., Inc.) pp. 173–178 (1950).

(List continued on next page.)

Primary Examiner—Don Wong
Assistant Examiner—Shih-Chao Chen
(74) Attorney, Agent, or Firm—Burns, Doane, Swecker & Mathis, L.L.P.

(57) ABSTRACT

The present invention seeks to overcome the above-identified deficiencies in the art by providing a built-in printed spiral antenna which is small enough to satisfy the needs of future compact mobile terminals. According to exemplary embodiments, a built-in antenna is provided which includes a printed spiral metal strip that is connected to the mobile terminal's printed circuit board via a substrate. Matching of the antenna is performed by a matching bridge which is positioned between a feeding pin and a grounded post. By adjusting the length of the matching bridge, the matching of the antenna can be changed. In an alternative embodiment, a loading resistor is attached to the matching bridge in order to enhance the bandwidth of the antenna. The size of the antenna of the present invention can be reduced to 20–30% of the conventional PIFA antenna (i.e., less than 1/10 of the wavelength of the operating frequency). As a result, the antenna can be used in a very compact chassis.

20 Claims, 7 Drawing Sheets

U.S. PATENT DOCUMENTS

| | | | |
|---|---|---|---|
| 4,229,743 A | 10/1980 | Vo et al. ................... 343/749 |
| 4,356,492 A | 10/1982 | Kaloi ................... 343/700 MS |
| 4,571,595 A | 2/1986 | Phillips et al. ................ 343/745 |
| 4,723,305 A | 2/1988 | Phillips et al. ................. 455/89 |
| 4,742,359 A | 5/1988 | Ishino et al. ................ 343/895 |
| 4,860,020 A | 8/1989 | Wong et al. ................ 343/828 |
| 4,868,576 A | 9/1989 | Johnson, Jr. ................ 343/702 |
| 5,020,093 A | 5/1991 | Pireh ............................ 379/59 |
| 5,204,687 A | 4/1993 | Elliott et al. ................ 343/702 |
| 5,216,436 A | 6/1993 | Hall et al. ................ 343/895 |
| 5,298,910 A | 3/1994 | Takei et al. ................ 343/895 |
| 5,311,201 A | 5/1994 | Lillie et al. ................ 343/791 |
| 5,317,325 A | 5/1994 | Bottomley ................ 343/702 |
| 5,353,036 A | 10/1994 | Baldry ....................... 343/702 |
| 5,363,114 A | 11/1994 | Shoemaker ................ 343/828 |
| 5,386,203 A | 1/1995 | Ishihara ....................... 333/129 |
| 5,436,633 A | 7/1995 | Liu ................................ 343/723 |
| 5,438,339 A | 8/1995 | Itoh et al. ................... 343/702 |
| 5,446,469 A | 8/1995 | Makino ...................... 343/702 |
| 5,451,974 A | 9/1995 | Marino ....................... 343/895 |
| 5,467,096 A | 11/1995 | Takamoro et al. .......... 343/702 |
| 5,471,221 A | * 11/1995 | Nalbandian et al. . 343/700 MS |
| 5,479,178 A | * 12/1995 | Ha .............................. 343/702 |
| 5,532,703 A | * 7/1996 | Stephens et al. ............ 343/702 |
| 5,546,094 A | * 8/1996 | Egashira ...................... 343/702 |
| 5,548,827 A | * 8/1996 | Hanawa et al. ............. 455/129 |
| 5,550,820 A | * 8/1996 | Baran ......................... 370/60.1 |
| 5,594,457 A | * 1/1997 | Wingo ........................ 343/702 |
| 5,600,335 A | 2/1997 | Abramo ..................... 343/749 |
| 5,612,704 A | * 3/1997 | Cole ............................ 343/702 |
| 5,635,943 A | * 6/1997 | Grunwell .................... 343/702 |
| 5,661,496 A | * 8/1997 | Bak et al. ................... 343/702 |
| 5,764,197 A | * 6/1998 | Tsuru et al. ................ 343/895 |
| 5,797,084 A | * 8/1998 | Tsutu et al. ................. 455/73 |
| 5,892,490 A | * 4/1999 | Asakura et al. ............. 343/702 |
| 5,903,240 A | * 5/1999 | Kawahata et al. ... 343/700 MS |
| 5,929,825 A | * 7/1999 | Niu et al. ................... 343/895 |
| 5,949,385 A | * 9/1999 | Asakura et al. ............. 343/895 |
| 6,166,694 A | * 12/2000 | Ying ........................... 343/702 |

FOREIGN PATENT DOCUMENTS

| | | | |
|---|---|---|---|
| EP | 0 855 759 | | 7/1998 |
| EP | 0 884 796 | | 12/1998 |
| FR | 2 664 749 | | 1/1992 |
| GB | 2175748 | | 12/1986 |
| JP | 63-219204 | | 9/1988 |
| JP | 5-7109 | | 1/1993 |
| JP | 6-37531 | | 2/1994 |
| JP | 6-90108 | | 3/1994 |
| JP | 6-152221 | | 5/1994 |
| JP | H10-173430 | | 6/1998 |
| WO | WO93/12559 | * | 6/1993 |
| WO | WO94/21003 | * | 9/1994 |
| WO | 96/27219 | | 9/1996 |
| WO | WO96/38882 | * | 12/1996 |
| WO | WO97/11507 | * | 3/1997 |
| WO | WO97/47054 | | 12/1997 |
| WO | WO97/49141 | * | 12/1997 |

OTHER PUBLICATIONS

"Microwave Scanning Antennas", edited by R.C. Hansen, Peninsula Publishing, pp. 116–122 (1950).

European Search Report, File No. RS 102645 US, date of mailing, Mar. 31, 1999.

"FDTD Analysis of Printed Square Spiral Antennas for Wireless Communications", J. Chen, et al., IEEE Antennas and Propagation Society International Symposium 1997 Digest, vol. 3, Jul. 14, 1997, pps. 1550–1553.

"Spectral Domain Analysis of a Square Microstrip Spiral Antenna", S.C. Wu, et al., Proceedings of the Antennas and Propagation Society Annual Meeting, 1991, vol. 2, Jan. 1991, pps. 970–973.

* cited by examiner

MINIATURE PRINTED SPIRAL ANTENNA FOR MOBILE TERMINALS

RELATED APPLICATION

This application is related to U.S. patent application Ser. No. 09/112,152 to Ying, filed Jul. 9, 1998, and entitled "Printed Twin Spiral Dual Band Antenna", which is incorporated herein by reference.

BACKGROUND

The present invention relates generally to radio communication systems and, in particular, to a miniature printed spiral antenna which can be incorporated into a portable terminal.

The cellular telephone industry has made phenomenal strides in commercial operations in the United States as well as the rest of the world. Growth in major metropolitan areas has far exceeded expectations and is rapidly outstripping system capacity. If this trend continues, the effects of this industry's growth will soon reach even the smallest markets. Innovative solutions are required to meet these increasing capacity needs as well as maintain high quality service and avoid rising prices.

Throughout the world, one important step in the advancement of radio communication systems is the change from analog to digital transmission. Equally significant is the choice of an effective digital transmission scheme for implementing the next generation technology, e.g., time division multiple access (TDMA) or code division multiple access (CDMA). Furthermore, it is widely believed that the first generation of Personal Communication Networks (PCNs), employing low cost, pocket-sized, cordless telephones that can be carried comfortably and used to make or receive calls in the home, office, street, car, etc., will be provided by, for example, cellular carriers using the next generation digital cellular system infrastructure.

To provide an acceptable level of equipment compatibility, standards have been created in various regions of the world. For example, analog standards such as AMPS (Advanced Mobile Phone System), NMT (Nordic Mobile Telephone) and ETACS and digital standards such as D-AMPS (e.g., as specified in EIA/TIA-IS-54-B and IS-136) and GSM (Global System for Mobile Communications adopted by ETSI) have been promulgated to standardize design criteria for radio communication systems. Once created, these standards tend to be reused in the same or similar form, to specify additional systems. For example, in addition to the original GSM system, there also exists the DCS1800 (specified by ETSI) and PCS1900 (specified by JTC in J-STD-007), both of which are based on GSM.

However, the most recent evolution in cellular communication services involves the adoption of additional frequency bands for use in handling mobile communications, e.g., for Personal Communication Services (PCS) services. Taking the U.S. as an example, the Cellular hyperband is assigned two frequency bands (commonly referred to as the A frequency band and the B frequency band) for carrying and controlling communications in the 800 MHz region. The PCS hyperband, on the other hand, is specified in the United States to include six different frequency bands (A, B, C, D, E and F) in the 1900 MHz region. Thus, eight frequency bands are now available in any given service area of the U.S. to facilitate communication services. Certain standards have been approved for the PCS hyperband (e.g., PCS1900 (J-STD-007)), while others have been approved for the Cellular hyperband (e.g., D-AMPS (IS-136)).

Each one of the frequency bands specified for the Cellular and PCS hyperbands is allocated a plurality of traffic channels and at least one access or control channel. The control channel is used to control or supervise the operation of mobile stations by means of information transmitted to and received from the mobile stations. Such information may include incoming call signals, outgoing call signals, page signals, page response signals, location registration signals, voice channel assignments, maintenance instructions, hand-off, and cell selection or reselection instructions as a mobile station travels out of the radio coverage of one cell and into the radio coverage of another cell. The control and voice channels may operate using either analog modulation or digital modulation.

The signals transmitted by a base station in the downlink over the traffic and control channels are received by mobile or portable terminals, each of which have at least one antenna. Historically, portable terminals have employed a number of different types of antennas to receive and transmit signals over the air interface. For example, monopole antennas mounted perpendicularly to a conducting surface have been found to provide good radiation characteristics, desirable drive point impedances and relatively simple construction. Monopole antennas can be created in various physical forms. For example, rod or whip antennas have frequently been used in conjunction with portable terminals. For high frequency applications where an antenna's length is to be minimized, another choice is the helical antenna.

Presently, antennas for radio communication devices, such as mobile phones, are mounted directly on the phone chassis. However, as the size and weight of portable terminals continue to decrease, the above-described antennas become less advantageous due to their size. As a result, built-in antennas will be necessary for these future compact portable terminals which are capable of operating in a 300 MHz to 3000 MHz frequency range.

Conventional built-in antennas currently in use in mobile phones include microstrip patch antennas and planar inverted-F antennas. Microstrip antennas are small in size and light in weight. The planar inverted-F antenna (PIFA) has already been implemented in a mobile phone handset, as described by K. Qassim, "Inverted-F Antenna for Portable Handsets", IEE Colloqium on Microwave Filters and Antennas for Personal Communication Systems, pp.3/1–3/16, February 1994, London, UK. And, more recently, Lai et al. has published a meandering inverted-F antenna (WO 96/27219). This antenna has a size which is about 40% of that of the conventional PIFA antenna.

Figure 1A:
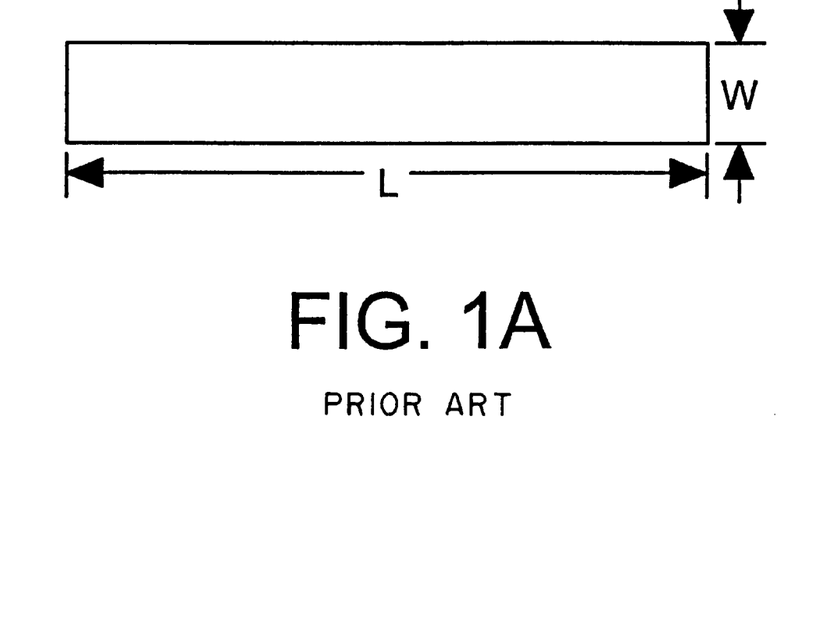
FIGS. 1A and 1B illustrate the conventional planar patch antenna compared to the conventional meandering inverted-F antenna.
Figure 1B:
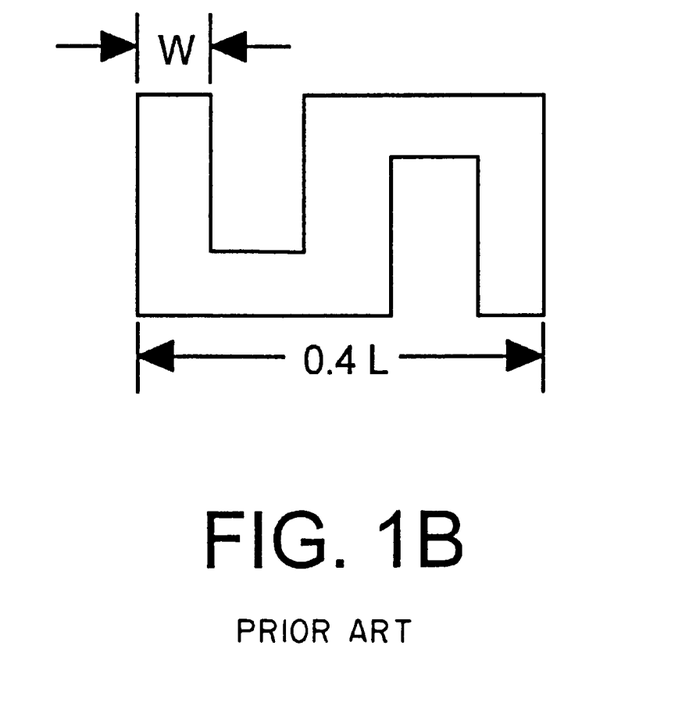

FIGS. 1A and 1B illustrate the conventional planar patch antenna compared to the meandering inverted-F antenna described in Lai et al. The conventional planar patch antenna of FIG. 1A has both a size and length equal to, for example, a quarter wavelength of the frequency to which the antenna is to be made resonant. The conventional planar patch antenna also has a width of W. The meandering inverted-F antenna, illustrated in FIG. 1B, also has a length equal to a quarter wavelength of the resonant frequency and a width equal to W; however, the size of the meandering inverted-F antenna is reduced to about 40% of the size of the conventional planar patch antenna. This reduction in size is attributable to the antenna's meandering shape.

As mobile phones become smaller and smaller, both conventional microstrip patch and PIFA antennas are still too large to fit the future small phone chassis. This is particularly problematic when next generation phones need multiple antennas for cellular, wireless local area network, GPS and diversity.

SUMMARY

The present invention seeks to overcome the above-identified deficiencies in the art by providing a built-in printed spiral antenna which is small enough to satisfy the needs of future compact mobile terminals. According to exemplary embodiments, a built-in antenna is provided which includes a printed spiral metal strip that is connected to the mobile terminal's printed circuit board via a substrate. Matching of the antenna is performed by a matching bridge which is positioned between a feeding pin and a grounded post. By adjusting the length of the matching bridge, the matching of the antenna can be changed. In an alternative embodiment, a loading resistor is attached to the matching bridge in order to enhance the bandwidth of the antenna. The size of the antenna of the present invention can be reduced to 20–30% of the conventional PIFA antenna (i.e., less than 1/10 of the wavelength of the operating frequency). As a result, the antenna can be used in a very compact chassis.

BRIEF DESCRIPTION OF THE DRAWINGS

The above objects and features of the present invention will be more apparent from the following description of the preferred embodiments with reference to the accompanying drawings, wherein.

DETAILED DESCRIPTION

Figure 2:
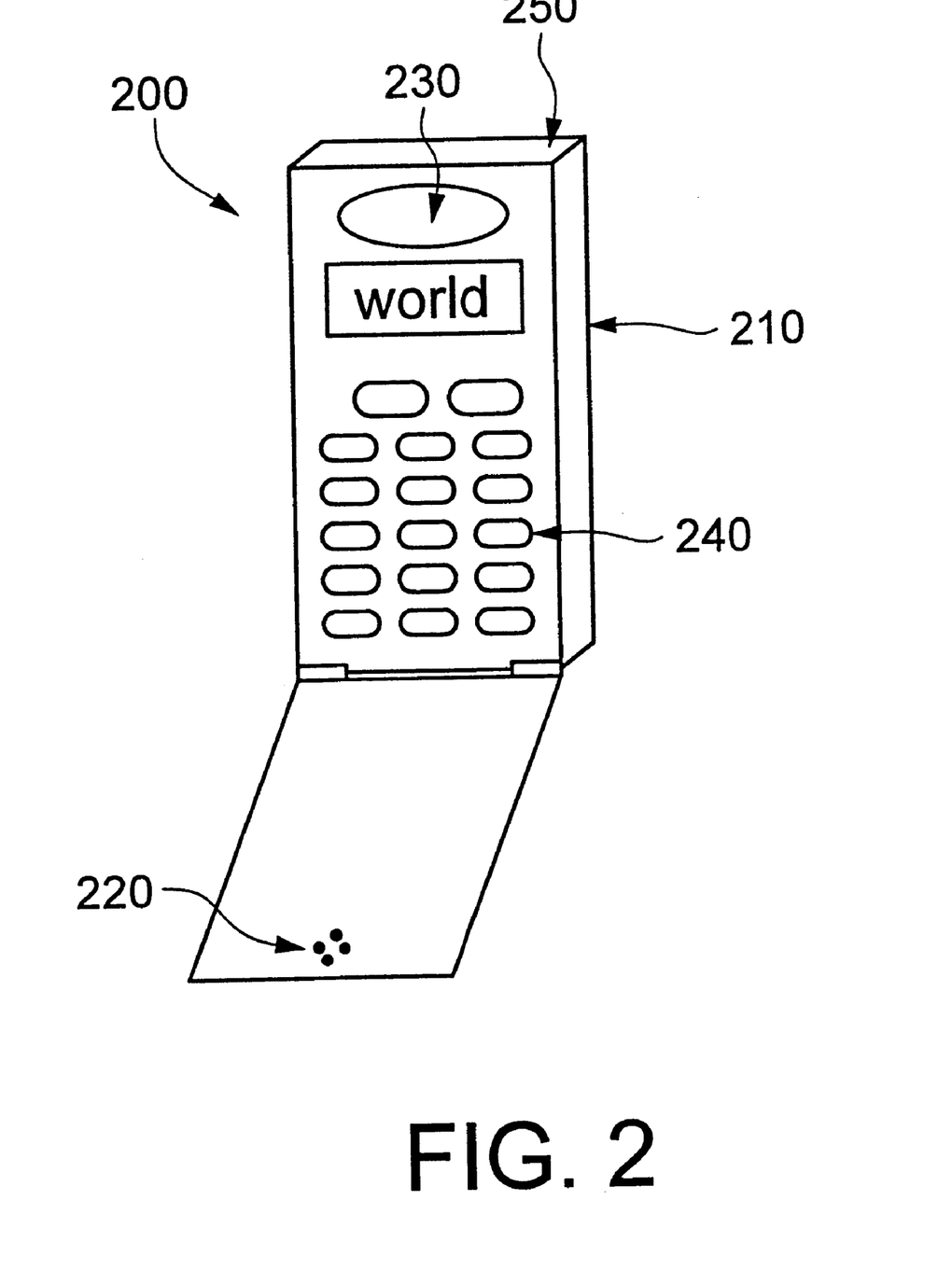
FIG. 2 illustrates a radio communication device in which the antenna of the present invention may be implemented.

FIG. 2 illustrates a radio communication device 200 in which the built-in antenna of the present invention may be implemented. Communication device 200 includes a chassis 210 having a microphone opening 220 and speaker opening 230 located approximately next to the position of the mouth and ear, respectively, of a user. A keypad 240 allows the user to interact with the communication device, e.g., by inputting a telephone number to be dialed. The communication device 200 also includes a built-in antenna assembly 250, the details of which will be described below.

Figure 3:
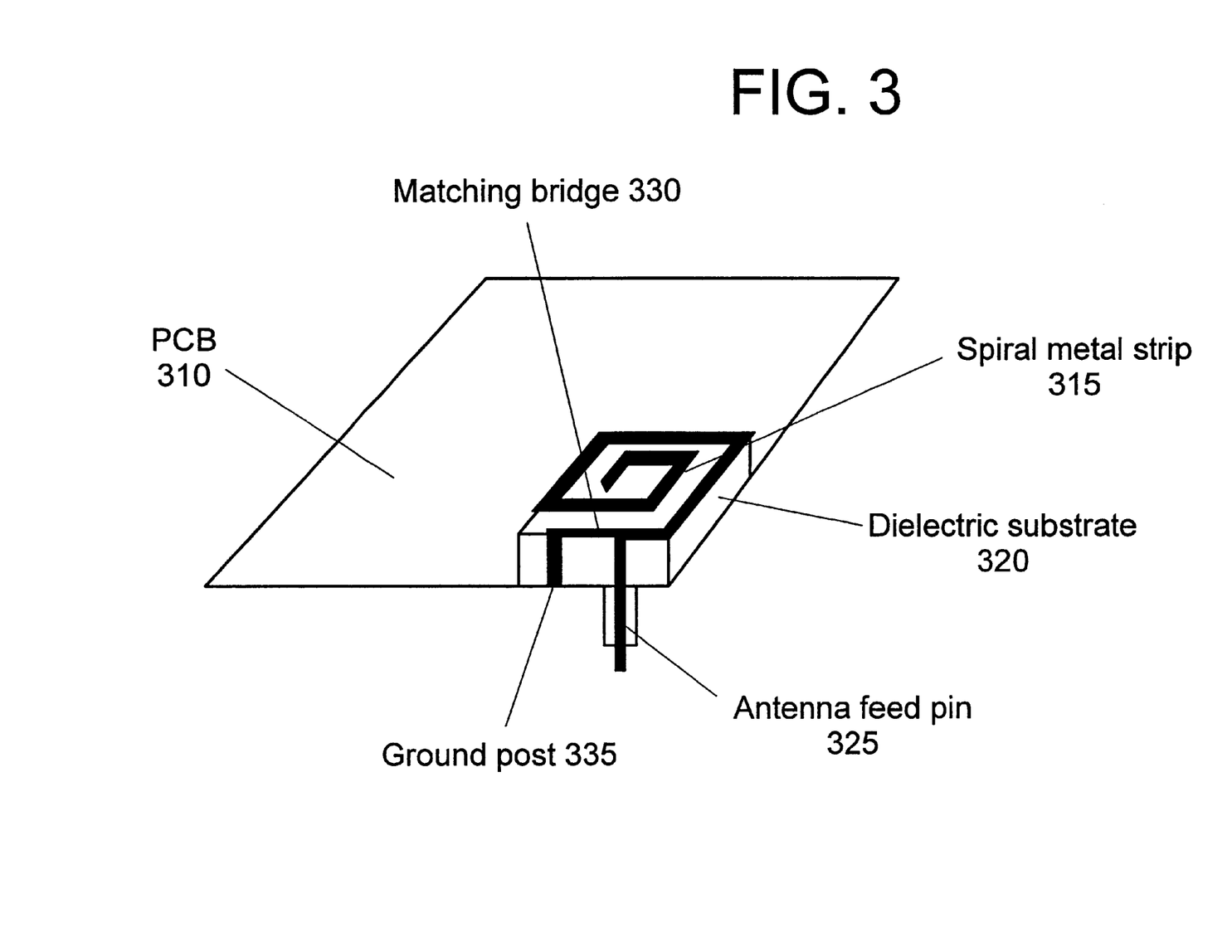
FIG. 3 illustrates the built-in antenna according to a first embodiment of the present invention.

FIG. 3 illustrates the built-in antenna assembly according to an exemplary embodiment of the present invention. The built-in antenna, according to the present invention, includes a printed metallic strip 315 which is configured in an inner spiral shape and is attached to the printed circuit board (PCB) 310 of the communication device via a dielectric substrate 320. The inner spiral shape allows for a reduction in size over the conventional planar patch and meandering inverted-F antennas. By forming the printed metallic strip in an inner spiral shape, the size of the antenna, according to the present invention, can be reduced to about 20% of the conventional planar patch antenna while still maintaining a length of ¼ wavelength. One skilled in the art will appreciate that the length of the printed metallic strip of the present invention is not limited to ¼ wavelength, but other lengths may be chosen, such as ½ wavelength.

The printed spiral metallic strip 315 is fed by an antenna feed pin 325 at the end of the outer turn of the spiral. One skilled in the art will appreciate that the current on the spiral metallic strip 315 decays from the feeding point 325 to the other end of the metallic strip. As a result, the antenna has higher radiation efficiency when the current is distributed mostly in the outer edge of the antenna.

Figure 4:
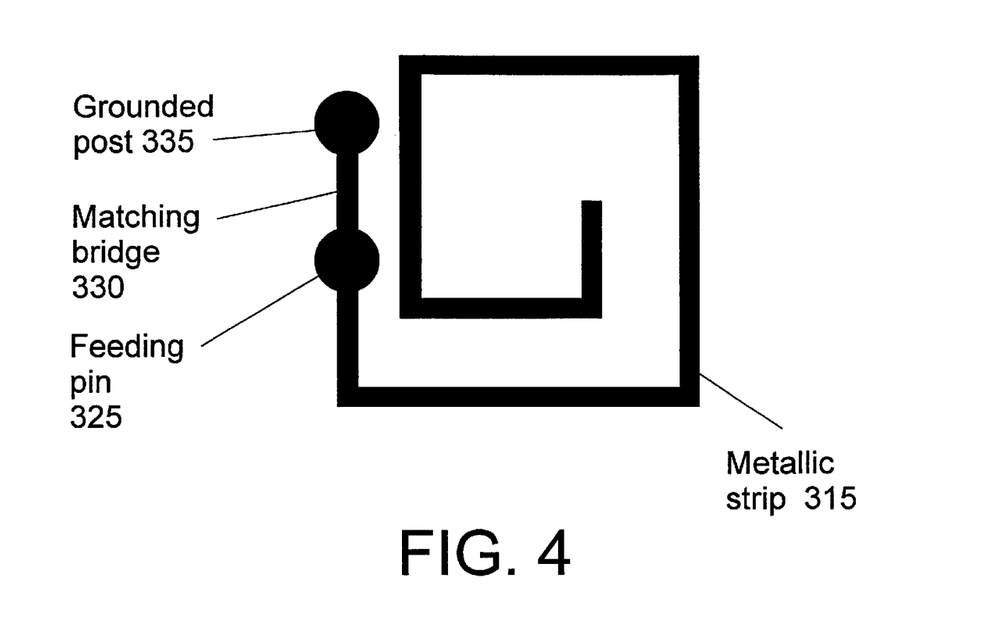
FIG. 4 illustrates a top view of the built-in spiral antenna of the present invention.

As illustrated in FIG. 3 and in the top view of the antenna set forth in FIG. 4, the built-in antenna also includes a matching bridge 330 positioned between the feeding pin 325 and the grounded post 335. The matching bridge 330 acts to tune the antenna and forms a small loop antenna between the feeding pin 325 and grounded post 335. Tuning of an antenna refers to matching the impedance seen by an antenna at its input terminals such that the input impedance is seen to be purely resistive, i.e., it will have no appreciable reactive component. The tuning of the antenna system of the present invention is performed by measuring or estimating the input impedance associated with the antenna and providing an appropriate impedance matching circuit (i.e., the matching bridge). The matching of the antenna, according to the present invention, can be adjusted by changing the length of the matching bridge 330. This is accomplished by simply changing the location of the grounded post 335. The length of the matching bridge is generally in the order of 0.01λ to 0.1λ.

As is evident from FIG. 3, the printed spiral antenna is positioned over the PCB and forms a spiral slot between the spiral metallic strip 315 and the PCB 310. One skilled in the art will appreciate that it is the spiral slot that forms the main radiator (or sensor) of the present antenna system.

The resonant frequency and bandwidth of the built-in antenna of the present invention are dependent upon the area and thickness of the dielectric substrate, the type of dielectric material selected (i.e., the dielectric constant), the spiral length of the metallic strip and the rate of expansion of the spiral. Generally, the length of the printed spiral metallic strip is selected to be approximately ¼ wavelength of the frequency band to which the antenna is to be tuned. One skilled in the art will appreciate, however, that other lengths may be chosen, such as ½ wavelength. One skilled in the art will also appreciate that an increase in the area or thickness of the dielectric substrate or the tightness of the spiral (i.e., the rate of the expansion of the spiral) or a decrease in the value of the dielectric constant results in an increase in the bandwidth which can be achieved.

As is evident from FIG. 3, the spiral antenna of the present invention can be mounted at the edge of the PCB which provides for better radiation efficiency and bandwidth. In addition, the PCB space requirement for the spiral antenna is minimized due to its small size.

The antenna assembly of the present invention works as a magnetic antenna. As a result, the spiral metal strip creates nearly circular polarized waves (as opposed to linear polarized waves achieved by the conventional antennas described above with respect to FIGS. 1A and 1B) when the rate of expansion of the spiral (i.e., the tightness of the spiral) is chosen properly. This would be advantageous in a multipath environment, such as mobile radio communications, and in satellite (e.g., GPS) communications where circular polarized signals are generally used. Moreover, as a magnetic antenna, there is less interference from the human body.

Figure 5:
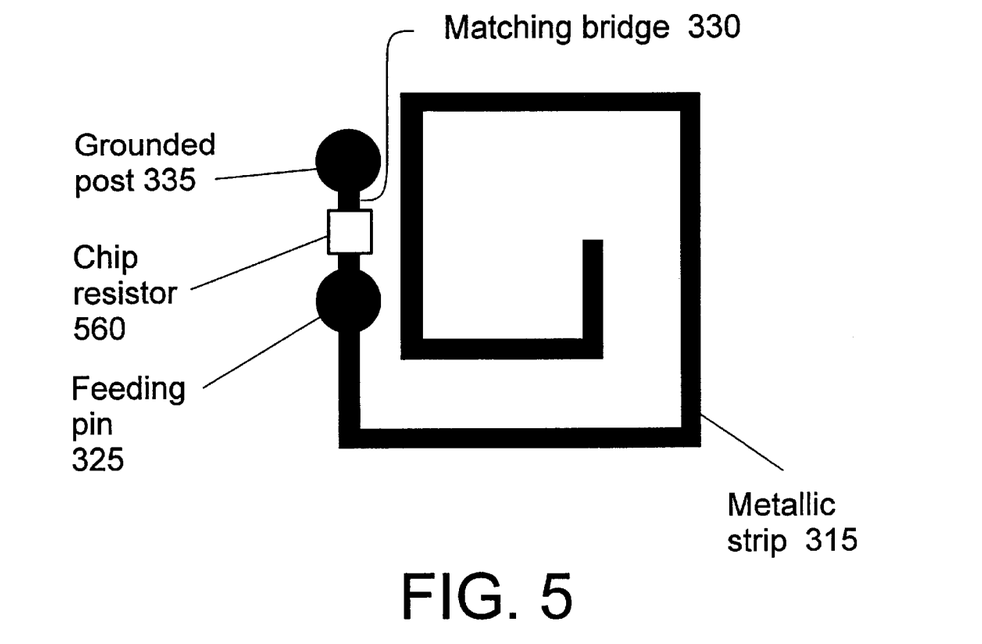
FIG. 5 illustrates the built-in spiral antenna according to a second embodiment of the present invention.

FIG. 5 illustrates the built-in spiral antenna according to a second embodiment of the present invention. One skilled in the art will appreciate that a printed antenna on a ground plane has a narrower bandwidth than the bandwidth of the earlier-described conventional monopole or dipole antenna. The bandwidth of such a printed antenna can be enhanced by introducing some loss into the system. This is evident from the fact that loss always indicates a lower Q-factor and thus a higher bandwidth. The following equation illustrates the relationship between the Q-factor and the achievable bandwidth:

$$Q=f0/BW$$

where f0 is the center frequency and BW is the bandwidth.

According to an exemplary embodiment of the present invention, a loading resistor 560 is connected in series to the matching bridge 330 in order to introduce loss into the system. In the alternative, the same result can be achieved by connecting the resistor 560 in parallel to the grounded post 335. The resistor of the present invention can be either a chip resistor or a resistor film. The resistor introduces loss in the antenna's radiated power which results in broader bandwidth.

The resistor value can be selected in order to satisfy particular design requirements. In a situation where high efficiency is needed (i.e., loss is to be kept small), a small resistor value should be used. However, in a situation where a wide bandwidth is critical, a larger resistor value should be used.

Figure 6:
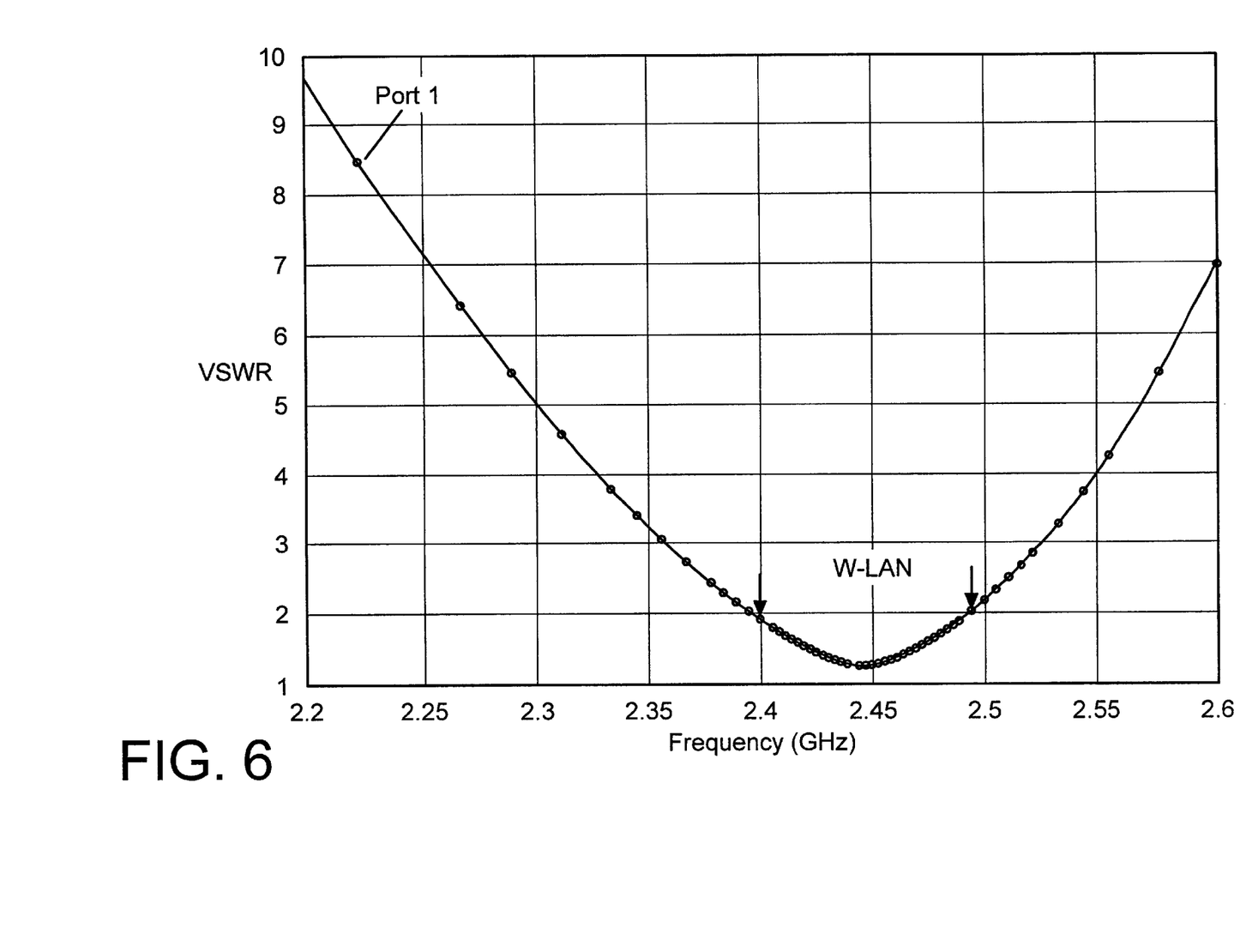
FIG. 6 illustrates the VSWR performance of a miniature printed spiral antenna of the present invention designed for a W-Lan application.
Figure 7:
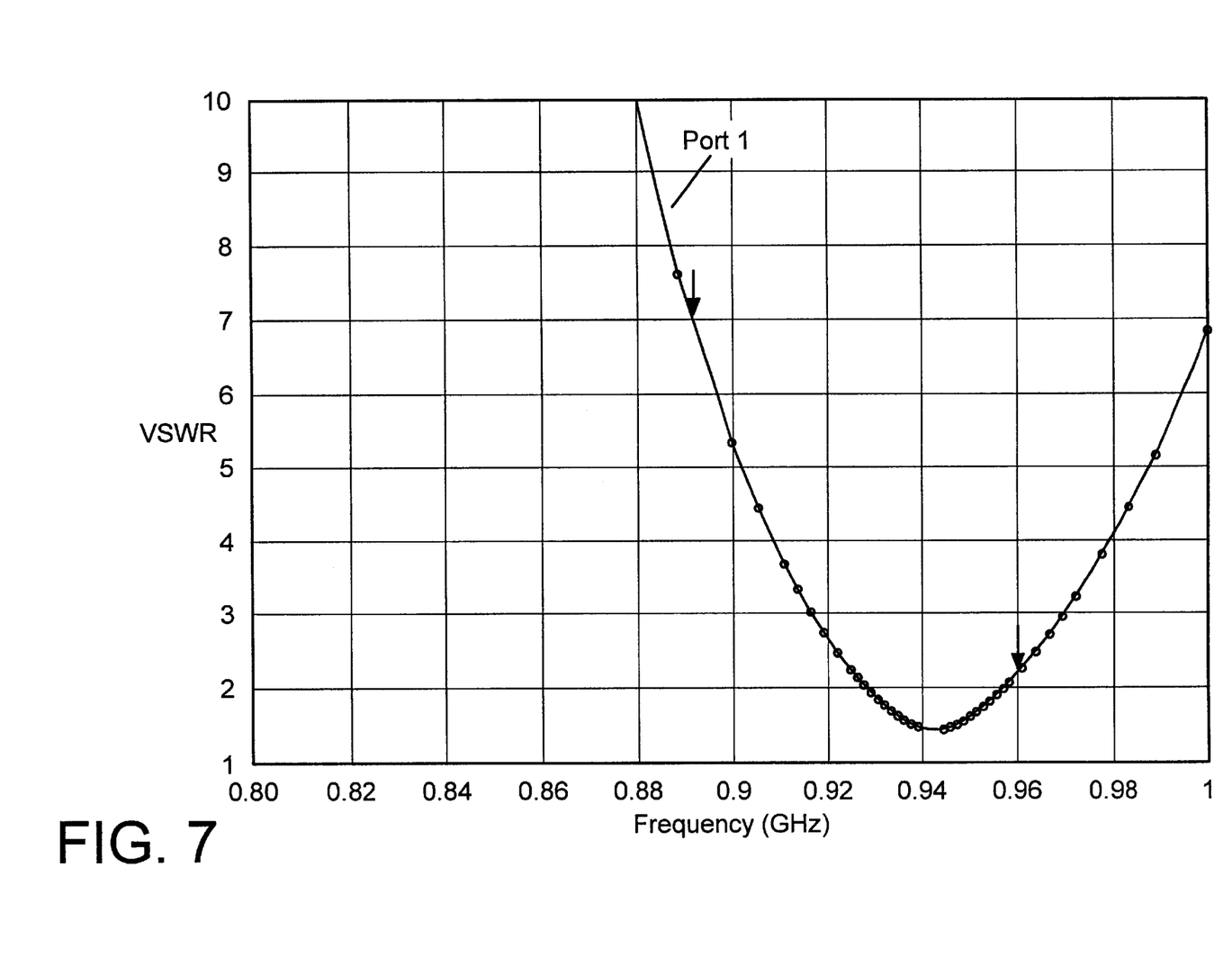
FIG. 7 illustrates the VSWR performance of a miniature printed spiral antenna of the present invention designed for operation in the GSM band.
Figure 8:
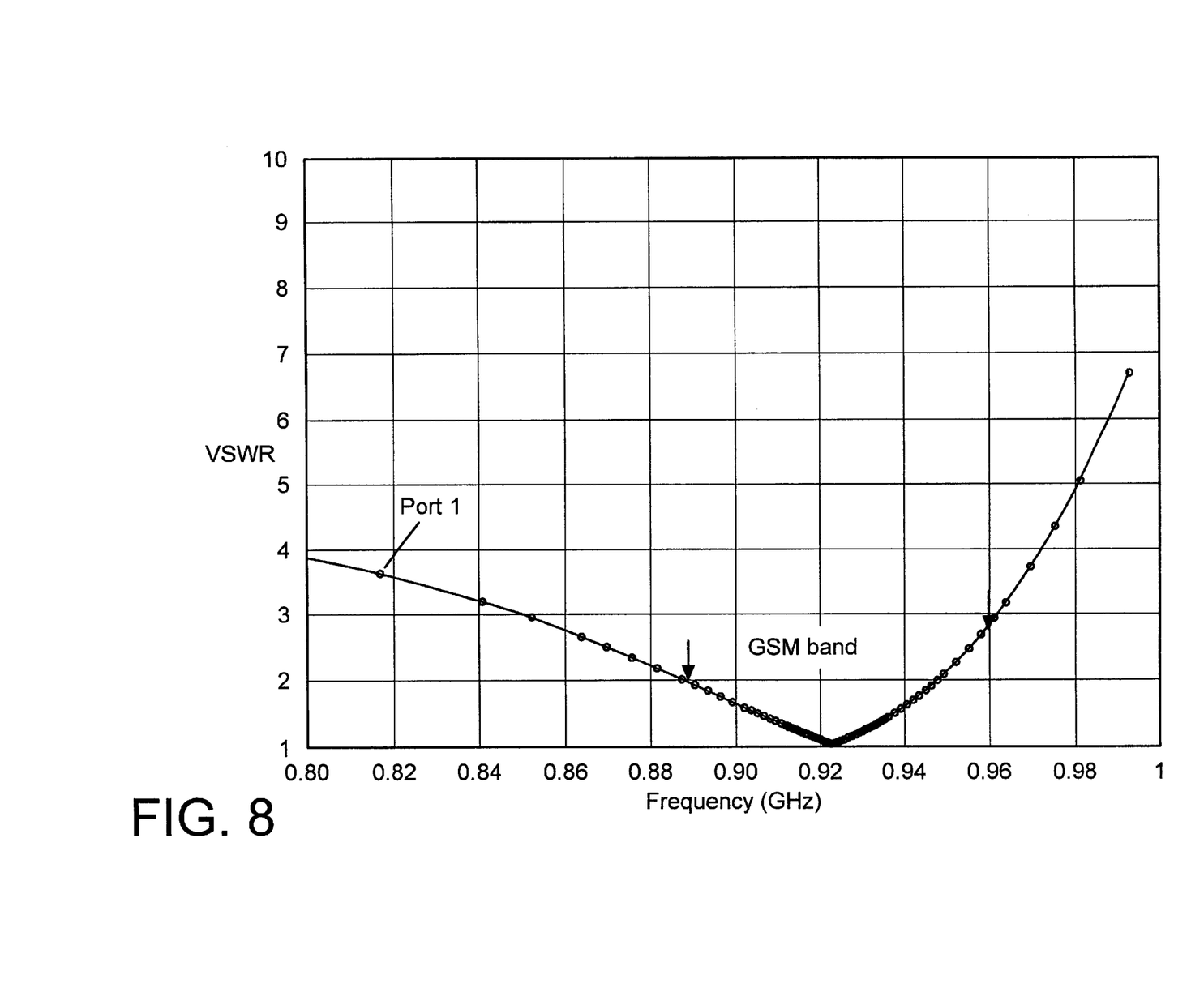
FIG. 8 illustrates the VSWR performance of the miniature printed spiral antenna of FIG. 7 implementing the resistor enhancement technique of the present invention.

In order to illustrate the effectiveness of the present invention, FIGS. 6–8 set forth results of simulations for exemplary built-in spiral antennas. The antennas in the simulations were mounted on a printed circuit board via a dielectric substrate. In the first simulation, the results of which are illustrated in FIG. 6, a design for a W-LAN application was considered. The printed spiral antenna had a length of 0.082 wavelength, a width of 0.08 wavelength and a height of 0.04 wavelength. The bandwidth of the antenna was 5.3% for a VSWR less than 2.5:1. FIG. 6 illustrates the VSWR performance of the antenna of the present invention for the first simulation. It is evident from FIG. 6 that the antenna achieves approximately 130 MHz for a 2.45 GHz band, which would satisfy the requirements for a W-LAN application.

In the second simulation, the antenna was designed for operation in the GSM band. The length of the printed spiral antenna was 0.073 wavelength (22 mm), the width was 0.067 wavelength (20 mm) and the height was 0.04 wavelength (12 mm). The bandwidth of the antenna was 4.2% for a VSWR less than 2.5:1. In this simulation, the antenna achieved approximately 40 MHz for the GSM band which would not satisfy the requirements for a GSM application. FIG. 7 shows the VSWR performance for this design.

In the third simulation, bandwidth enhancement was introduced to the GSM band antenna set forth above by attaching a 1 ohm chip resistor to the matching bridge of the antenna. As a result, the bandwidth of the antenna is increased to 9.3% (about 88 MHz). The VSWR performance for this simulation is illustrated in FIG. 8. The performance of this bandwidth enhanced antenna would satisfy the requirements for a GSM application; however, the antenna's gain is reduced approximately 3 dB.

The foregoing has described the principles, preferred embodiments and modes of operation of the present invention. However, the invention should not be construed as being limited to the particular embodiments discussed above. For example, while the antenna of the present invention has been discussed primarily as being a radiator, one skilled in the art will appreciate that the printed miniature spiral antenna would also be used as a sensor for receiving information at specific frequencies. Thus, the above-described embodiments should be regarded as illustrative rather than restrictive, and it should be appreciated that variations may be made in those embodiments by workers skilled in the art without departing from the scope of the present invention as defined by the following claims.

what is claimed is:

1. A communication device for use in a radio communication system, said device comprising:
    a microphone opening for allowing the communication device to receive auditory information from a user;
    a speaker opening for allowing the communication device to transmit auditory information to said user;
    a keypad;
    an antenna comprising a printed spiral metallic strip, wherein said antenna is a built-in antenna; and
    a matching bridge for matching an input impedance of said antenna.

2. The communication device of claim 1 wherein the matching of said antenna is adjusted by changing a length of the matching bridge.

3. The communication device of claim 1 wherein said printed spiral metallic strip is fed with a current at an end of an outer turn of said printed spiral metallic strip.

4. The communication device of claim 1 further comprising a printed circuit board onto which said built-in antenna is mounted.

5. The communication device of claim 1 wherein a length of said printed spiral metallic strip is selected to be approximately ¼ wavelength of the frequency band to which the antenna is to be tuned.

6. A communication device for use in a radio communication system, said device comprising:
    a microphone opening for allowing the communication device to receive auditory information from a user;
    a speaker opening for allowing the communication device to transmit auditory information to said user;
    a keypad;
    an antenna comprising a printed spiral metallic strip, wherein said antenna is a built-in antenna;
    a matching bridge for matching an input impedance of said antenna; and
    a loading resistor attached to said matching bridge for enhancing a bandwidth of said antenna.

7. A communication device for use in a radio communication system, said device comprising:
    a printed circuit board mounted on a chassis of said communication device;
    a substrate attached to said printed circuit board and having a predetermined thickness;
    an antenna mounted on said substrate and comprising a printed spiral metallic strip, wherein said antenna is a built-in antenna; and
    a matching bridge for matching an input impedance of said antenna.

8. The communication device of claim 7 wherein a length of said printed spiral metallic strip is selected to be approximately ¼ wavelength of the frequency band to which the antenna is to be tuned.

9. The communication device of claim 7 wherein a bandwidth of said antenna depends on a size of said printed spiral metallic strip and the thickness and dielectric constant of said substrate.

10. A communication device for use in a radio communication system, said device comprising:
   a printed circuit board mounted on a chassis of said communication device;
   a substrate attached to said printed circuit board and having a predetermined thickness;
   an antenna mounted on said substrate and comprising a printed spiral metallic strip, wherein said antenna is a built-in antenna; and
   a matching bridge for matching an input impedance of said antenna and located between a feeding point and a grounded post.

11. The communication device of claim 10 wherein the matching of said antenna is adjusted by changing a length of the matching bridge.

12. The communication device of claim 10 further comprising a loading resistor attached to said matching bridge for enhancing a bandwidth of said antenna.

13. The communication device of claim 10 wherein said matching bridge forms a loop antenna between said feeding point and said grounded post.

14. An antenna for a radio communication device, said antenna comprising:
   a printed spiral metallic strip;
   a matching bridge for matching an input impedance of said antenna; and
   a loading resistor attached to said matching bridge;
   wherein said antenna is a built-in antenna.

15. The antenna of claim 14 wherein a bandwidth of said antenna depends on a value of said loading resistor.

16. The antenna of claim 14 wherein the matching of said antenna is adjusted by changing a length of the matching bridge.

17. The antenna of claim 14 wherein said printed spiral metallic strip is connected to a printed circuit board of said radio communication device via a substrate.

18. The antenna of claim 14 wherein a current in said printed spiral metallic strip is fed at an end of an outer turn of said printed spiral metallic strip.

19. The antenna of claim 14 wherein a length of said printed spiral metallic strip is selected as approximately ¼ wavelength of the frequency band to which the antenna is to be tuned.

20. A communication device for use in a radio communication system, said device comprising:
   a microphone opening for allowing the communication device to receive auditory information from a user;
   a speaker opening for allowing the communication device to transmit auditory information to said user;
   a keypad;
   an antenna comprising a printed spiral metallic strip, wherein said antenna is a built-in antenna; and
   a matching bridge for matching an input impedance of said antenna, wherein said matching bridge is interposed between a ground post and a feeding point and wherein said matching bridge, ground post, and feeding point are located at one end of said printed spiral metallic strip.

* * * * *